United States Patent
Miyake et al.

(10) Patent No.: US 6,292,234 B1
(45) Date of Patent: Sep. 18, 2001

(54) PROJECTION TYPE COLOR LIQUID CRYSTAL DISPLAY DEVICE

(75) Inventors: Takahiro Miyake, Soraku-gun; Kazuhiko Ueda, Kitakatsuragi-gun, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/010,929

(22) Filed: Jan. 22, 1998

(30) Foreign Application Priority Data

Jan. 23, 1997 (JP) .................................................... 9-010718

(51) Int. Cl.[7] ................. H04N 5/74; G02F 1/00
(52) U.S. Cl. .......................... 348/766; 348/756; 348/751; 348/761; 348/790; 348/791
(58) Field of Search .................................... 348/766, 750, 348/751, 756, 755, 761, 742, 790, 791; 359/483–503; 349/9; 353/31

(56) References Cited

U.S. PATENT DOCUMENTS

| | | | |
|---|---|---|---|
| 4,796,978 | * | 1/1989 | Tanaka et al. ............................ 349/9 |
| 4,935,758 | * | 6/1990 | Miyatake et al. ..................... 359/490 |
| 4,936,658 | * | 6/1990 | Tanaka et al. ............................ 349/9 |
| 5,073,013 | * | 12/1991 | Sonehara et al. ..................... 348/761 |
| 5,075,798 | * | 12/1991 | Sonehara et al. ..................... 348/751 |
| 5,098,183 | * | 3/1992 | Sonehara ................................ 353/31 |
| 5,161,042 | * | 11/1992 | Hamada ................................. 349/62 |
| 5,548,349 | * | 8/1996 | Mizuguchi et al. .................. 348/766 |
| 5,654,775 | * | 8/1997 | Brennesholtz ........................ 348/742 |
| 5,852,479 | * | 12/1998 | Ueda et al. .............................. 349/9 |
| 6,067,193 | * | 5/2000 | Sekine et al. ......................... 359/489 |
| 6,094,240 | * | 7/2000 | Hiyama et al. .......................... 349/9 |

FOREIGN PATENT DOCUMENTS

| | | |
|---|---|---|
| 4-60538 | 2/1992 | (JP) . |
| 9-80371 | 3/1997 | (JP) . |
| 9-90311 | 4/1997 | (JP) . |

* cited by examiner

*Primary Examiner*—Reinhard J. Eisenzopf
*Assistant Examiner*—Linus H Lo
(74) *Attorney, Agent, or Firm*—Nixon & Vanderhye PC

(57) ABSTRACT

A projection type color liquid crystal display apparatus includes: light collimation means for producing collimated light; main-wavelength band separation means for receiving the collimated light from the light collimation means and producing a plurality of light beams having respectively different wavelength bands and exiting at respectively different angles; sub-wavelength band separation means provided adjacent the main-wavelength band separation means, the sub-wavelength band separation means receiving the collimated light from the light collimation means and producing at least one light beam having the same wavelength band as the wavelength band of at least one of the light beams from the main-wavelength band separation means; a liquid crystal display device for receiving the light beams from the main-wavelength band separation means and the light beams from the sub-wavelength band separation means and modulating the light beams; and an optical system for receiving the light beams transmitted through the liquid crystal display device and thereby projecting an image.

11 Claims, 10 Drawing Sheets

PROJECTION TYPE COLOR LIQUID CRYSTAL DISPLAY DEVICE

BACKGROUND OF THE INVENTION

1. Field of the Invention

The present invention relates to a projection type color liquid crystal (LC) display apparatus for projecting an image onto a screen.

2. Description of the Related Art

Image display apparatuses are available which display an image on a cathode ray tube (CRT) display and project the image on the CRT display onto a screen. In recent years, however, projection type color LC display apparatuses (which incorporate LC display devices) have been proposed to replace such projection type display apparatuses. There is a class of projection type color LC display apparatuses called a "single plate type" (e.g., as disclosed in Japanese Laid-open Publication No.4-60538) which incorporate a single LC display device. Single plate type projection type color LC display apparatuses are known as especially suitable for use in systems with small dimensions due to their relatively simple optical systems.

A single plate-type projection type color LC display apparatus is illustrated in FIG. 11. As shown in FIG. 11, light from a incandescent light source 101 is reflected from a mirror 102 (shaped as an ellipsoid of revolution), which is disposed in such a manner that its first focal point coincides with the location of the light source 101, and converges onto the second focal point of the mirror 102.

The light converged at the second focal point of the mirror 102 is passed through an integrator 103 (which is located near the second focal point of the mirror 102), whereby it becomes uniform in terms of its angular distribution, i.e., dispersed. This light is further collimated by means of a condenser lens 104. The collimated light is separated by dichroic mirrors 105R, 105G, and 105B (having selective reflectivity for red, green, and blue, respectively) into respective components of three primary colors, i.e., red (R), green (G), and blue (B). These light beams of three colors enter respective picture elements of a LC display device 106 corresponding to R, G, and B.

The LC display device 106 includes: a LC panel 107 for modulating its incident light in accordance with an image signal; a microlens array 108 for converging the light beams of three colors onto the respective picture elements of the LC display panel 107 corresponding to R, G, and B; a polarizing plate 109 disposed on the side of the microlens array 108 from which the light enters (defined as the "incident side"); and a polarizing plate 110 disposed on the side of the LC panel 107 from which the light goes out (defined as the "outgoing side").

FIG. 12 illustrates the configuration of the LC panel 107, which includes a LC layer 113 interposed between a pair of opposing substrates 111 and 112. A plurality of pixel electrodes 115 are disposed in a matrix shape on the surface of the substrate 111. A thin film transistor (TFT) 116 and a storage capacitance 117 are provided corresponding to each pixel electrode 115 for driving the pixel electrode 115. One pixel is defined by a corresponding set of a pixel electrode 115, a TFT 116, and a storage capacitance 117.

Signal lines 118 are provided on the surface of the substrate 111 corresponding to respective columns of pixel electrodes 115, whereas gate lines 119 are provided corresponding to respective rows of pixel electrodes 115. A gate of each TFT 116 is coupled to a corresponding gate line 119; a source of the TFT 116 is coupled to a corresponding signal line 118; and a drain of the TFT 116 is coupled to a pixel electrode 115 and one of the electrodes of the storage capacitance 117. The other electrode of the storage capacitance 117 is set at a potential which is at the same level as that of a counter electrode 121. The substrate 111 thus constructed is commonly referred to as an "active matrix substrate".

On the counter substrate 112 opposing the active matrix substrate 111, a counter electrode 121 and a light shielding layer 122 are layered in this order. In positions of the light shielding layer 122 corresponding to the respective pixel electrodes 115, aperture regions 123 exist. The LC molecules in the LC layer 113 may take, for example, a twisted nematic orientation state.

FIG. 13 illustrates a cross section of the LC panel 107 and the microlens array 108. As seen from FIG. 13, the microlens array 108 includes microlenses 124 of a hexagonal shape wherein the outer peripheries of individual spherical lenses are merged with one another. Such a microlens array 108 can be produced by an ion exchange method.

The microlenses 124 are located relative to the picture elements 125 as shown in FIG. 14. Specifically, on the LC panel 107, repetitive sets of picture elements 125 of R, G, and B (arranged in this order) are provided in each horizontal line of the display. Furthermore, with respect to any two adjoining horizontal lines, each picture element 125 in the upper (lower) horizontal row is offset from the corresponding element 125 in the lower (upper) horizontal row by substantially half of the pitch of the picture elements 125. The microlenses 124 are disposed so that the optical axis of each microlens 124 coincides with the center of the "green" picture element 125G of the corresponding set of picture elements 125R, 125G, and 125B.

The light beams of R, G, and B entering the microlenses 124 thus disposed are converged to form convergence spots that fall within the aperture regions 123 of the picture elements 125 of the corresponding colors.

Referring back to FIG. 14, among the components of the light beams R, G, and B which have been reflected from the dichroic mirrors 105R, 105G, and 105B at their respective angles, only the P-polarization component passes through the polarizing plate 109, while the S-polarization component is absorbed by the polarizing plate 109.

The P-polarization component of the green light beam enters a microlens 124 along the direction of the normal axis of the microlens 124 (hereinafter referred to as the "normal direction"), so as to be converged on the aperture region 123 of the corresponding green picture element 125G. The P-polarization components of the red and blue light beams enter the microlens 124 at an angle θ (in opposite directions) with respect to the normal direction, so as to be respectively converged on the aperture regions 123 of the red and blue picture elements 125R and 125B flanking the green picture element 125G.

Thus, in the illustrated projection type color LC display apparatus, light beams of R, G, and B are respectively converged onto the corresponding picture elements 125R, 125G, and 125B of the LC display device 106. The light beams which have passed through the respective picture elements 125 are further projected onto a screen 128 via a field lens 126 and a projection lens 127, whereby color display is effected.

If the collimated light from the condenser lens 104 has a poor degree of parallelism in the above-described conventional color LC display apparatus, a portion of the collimated light may not be properly converged through the microlens array 108 to stay within the aperture region 123 (FIG. 12), and hence intercepted by the light shielding layer 122, i.e., not transmitted through the LC display device 106. As a result, the display images becomes darker.

The above-mentioned problem might appear to be overcome by simply optimizing the parallelism of the collimated light. However, such an approach has the following problems.

Since the parallelism of a collimated light beam generally decreases as the diameter of the collimated light beam decreases, the diameter of the collimated light beam must be maximized. However, there is an upper limit to the diameter of the collimated light beam. The reason is that an excessively large diameter of the collimated light beam causes peripheral portions of the collimated light beam to fall outside the dichroic mirrors 105R, 105G, or 105B and even the LC display device 106.

On the aspect of enhancement of the brightness of the displayed images, one may wish to increase the intensity of the light source 101. However, the larger the arc of the light source 101 becomes, the more difficult it becomes to maintain the parallelism of the collimated light beam.

Thus, under the prior art, it has been difficult to maintain the parallelism of the collimated light beam while employing a sufficiently bright light source 101, and hence to provide a bright displayed image.

SUMMARY OF THE INVENTION

A projection type color liquid crystal display apparatus according to the present invention includes: light collimation means for producing collimated light; main-wavelength band separation means for receiving the collimated light from the light collimation means and producing a plurality of light beams having respectively different wavelength bands and exiting at respectively different angles; sub-wavelength band separation means provided adjacent the main-wavelength band separation means, the sub-wavelength band separation means receiving the collimated light from the light collimation means and producing at least one light beam having the same wavelength band as the wavelength band of at least one of the light beams from the main-wavelength band separation means; a liquid crystal display device for receiving the light beams from the main-wavelength band separation means and the light beams from the sub-wavelength band separation means and modulating the light beams; and an optical system for receiving the light beams transmitted through the liquid crystal display device and thereby projecting an image.

In one embodiment of the invention, the collimated light includes a large amount of a wavelength component corresponding to the wavelength band of at least one of the light beams from the main-wavelength band separation means excluding the light beams having the wavelength bands of the light beams produced from the sub-wavelength band separation means.

In another embodiment of the invention, a polarization means for polarizing the collimated light in a uniform direction is provided between the light collimation means and the main-wavelength band separation means and the sub-wavelength band separation means.

In still another embodiment of the invention, the polarization means directs the collimated light beams to the main-wavelength band separation means and the sub-wavelength band separation means at respectively different angles.

Alternatively, a projection type color liquid crystal display apparatus according to the present invention includes: light collimation means for producing collimated light; a group of main-dichroic mirrors for receiving the collimated light from the light collimation means and producing three light beams having respectively different wavelength bands and exiting at respectively different angles; two groups of sub-dichroic mirrors provided adjacent the main-dichroic mirrors, the groups of sub-dichroic mirrors receiving the collimated light from the light collimation means and producing two light beams having the same wavelength bands as the wavelength bands of two of the light beams from the group of main-dichroic mirrors; a liquid crystal display device for receiving the light beams from the group of main-dichroic mirrors and the light beams from the group of the sub-dichroic mirrors and modulating the light beams; and an optical system for receiving the light beams transmitted through the liquid crystal display device and thereby projecting an image.

In one embodiment of the invention, the collimated light includes a large amount of a wavelength component corresponding to the wavelength band of one of the light beams from the group of main-dichroic mirrors excluding the light beams having the wavelength bands of the light beams produced from the groups of sub-dichroic mirrors.

Thus, in accordance with the above-described configuration, sub-wavelength band separation means are provided adjacent a main-wavelength band separation means such that peripheral portions of collimated light are incident on the sub-wavelength band separation means to form light beams from the peripheral portions of collimated light, which exit toward a LC display device. In other words, the peripheral portions of the collimated light is efficiently utilized by the sub-wavelength band separation means, thereby enhancing the brightness of the displayed image.

The collimated light preferably includes a large amount of the wavelength component corresponding to the wavelength band of one of the light beams from the main-wavelength band separation means excluding the light beams which also exit from the sub-wavelength band separation means.

Thus, with respect to the various components of the light entering the LC display device, an appropriate balance is obtained between the large amount of the wavelength component corresponding to the light beams which exit only from the main-wavelength band separation means and the total of the light beams exiting from the main-wavelength band separation means as well as the sub-wavelength band separation means.

A polarization means for polarizing the collimated light in a uniform direction may be provided between the light collimation means and the main-wavelength band separation means and the sub-wavelength band separation means. As a result, the light beams entering the LC display device are polarized in a uniform direction, so that the LC display device achieves an efficient display function.

The polarization means may direct the collimated light beams to the main-wavelength band separation means and the sub-wavelength band separation means at respectively different angles. In this case, the directions in which the light beams exit form the main-wavelength band separation means and the sub-wavelength band separation means can be controlled based on the angles at which the respective collimated light beams exit from the polarization means.

For example, the main-wavelength band separation means may be a group of main-dichroic mirrors for receiving collimated light from the light collimation means and producing three light beams with respectively different wavelength bands exiting at respectively different angles, with two groups of sub-dichroic mirrors being provided adjacent the group of main-dichroic mirrors. The sub-dichroic mirrors can receive collimated light from the light collimation means and produce two light beams having the same wavelength bands as the wavelength bands of two of the light beams exiting from the main-dichroic mirrors.

Thus, the invention described herein makes possible the advantage of providing a projection type color LC display apparatus capable of displaying bright images, where the apparatus maintains a sufficient parallelism of a collimated light beam with a sufficiently large diameter, and efficiently utilizes the collimated light beam while employing a sufficiently bright light source.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying figures.

EXAMPLE 1

Figure 1:
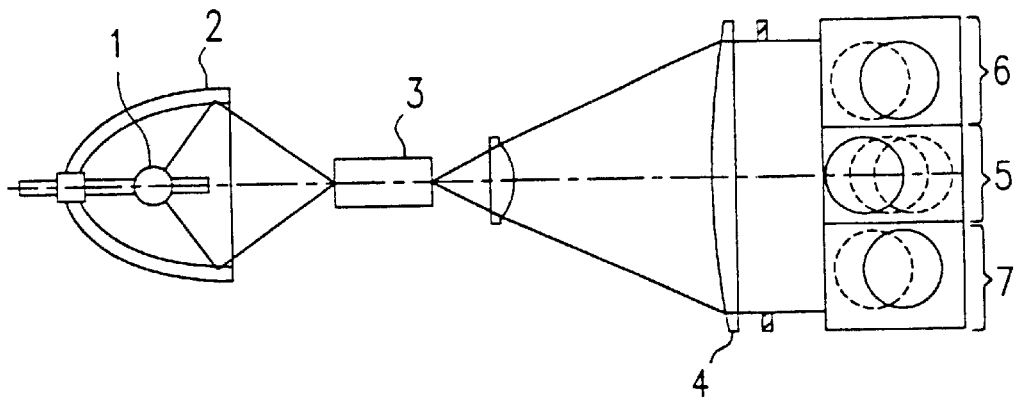
FIG. 1 is a side view illustrating a projection type color LC display apparatus according to a first embodiment of the invention.
Figure 2:
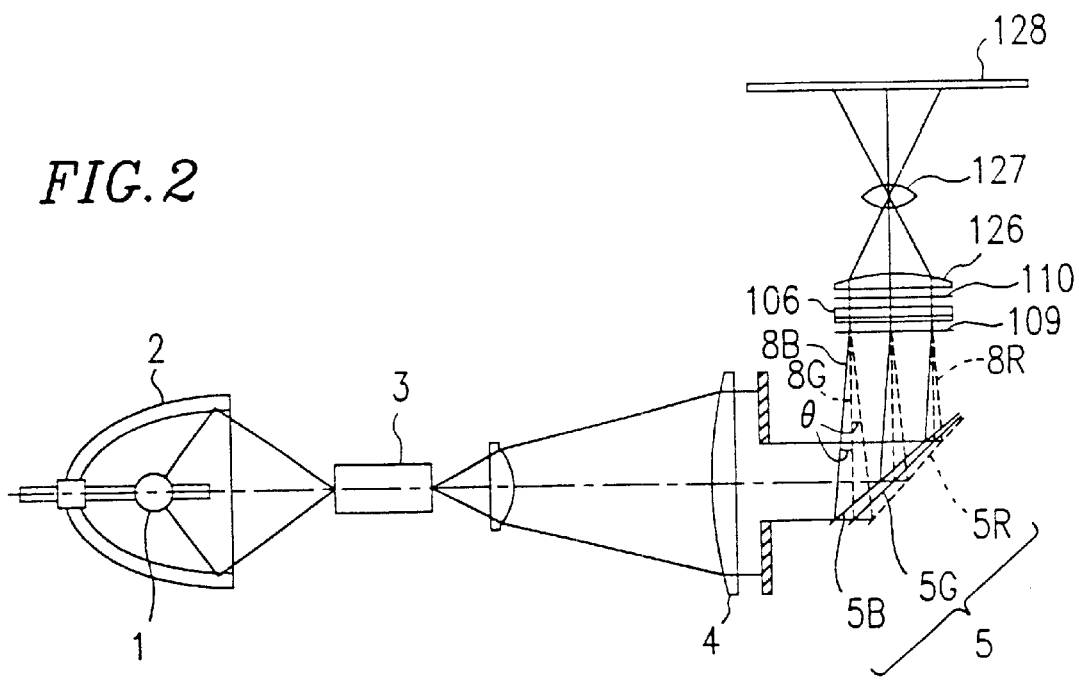
FIG. 2 is a plan view illustrating the projection type color LC display apparatus of the first embodiment (FIG. 1) as seen from above.
Figure 11:
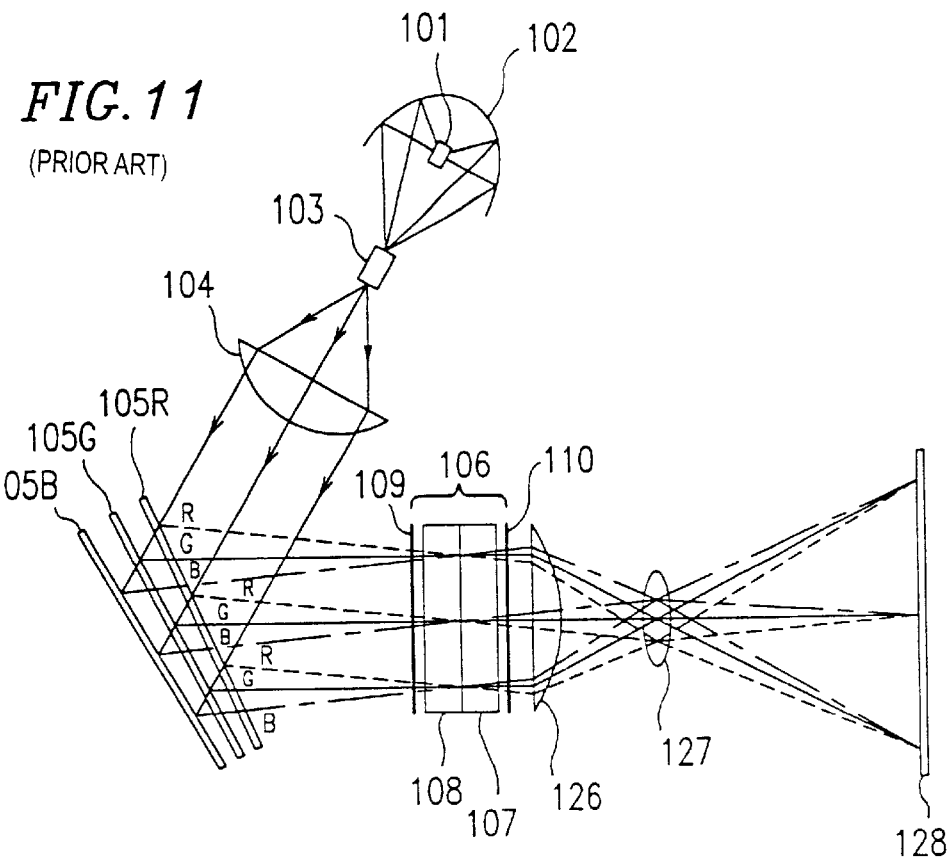
FIG. 11 is a side view illustrating a conventional apparatus.
Figure 12:
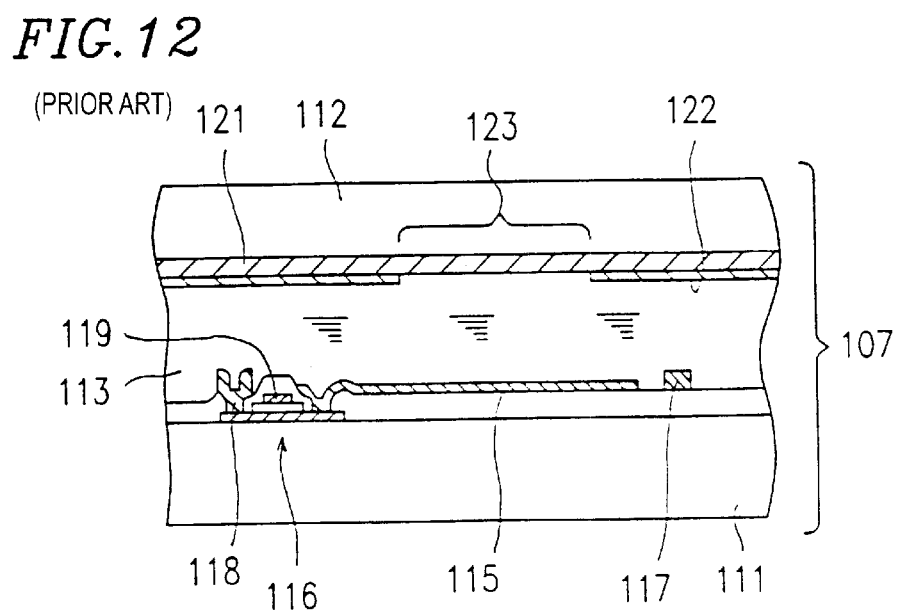
FIG. 12 is a cross-sectional view illustrating a LC panel.

FIG. 1 is a side view illustrating a projection type color LC display apparatus according to Example 1 of the invention. FIG. 2 is a plan view illustrating the projection type color LC display apparatus as seen from above. In both FIGS. 1 and 2, constituent elements having similar functions to those of the elements in the conventional apparatus shown in FIG. 11 are denoted by the same reference numerals as used therein.

It should be noted that, for conciseness, a LC display device 106, a polarizing plate 110 on the outgoing side, a field lens 126, a projection lens 127, and a screen 128 shown in FIG. 2 are not shown in FIG. 1. Similarly, groups 6 and 7 of sub-dichroic mirrors shown in FIG. 1 are not shown in FIG. 2.

The present apparatus incorporates an incandescent light source 1 which is a 250 W metal halide lamp (arc length: 3.0 mm). The light source 1 is disposed at a first focal point of a mirror 2 (having the shape of an ellipsoid of revolution with a first focal length of 22 mm and a second focal length of 110 mm, and an effective diameter $\phi$ of 80 mm), so that the light emitted therefrom is converged at the second focal point of the mirror 2. The light converged at the second focal point of the mirror 2 is led through an integrator 3, whereby it becomes uniform in terms of its angular distribution, i.e., dispersed. This light is further collimated by means of a condenser lens 4. The collimated light enters a group 5 of main-dichroic mirrors and the groups 6 and 7 of sub-dichroic mirrors located above and below (respectively) the main-dichroic mirrors 5.

As shown in FIG. 2, the main-dichroic mirrors 5 include main-dichroic mirrors 5R, 5G, and 5B (having selective reflectivity for red, green, and blue, respectively). The collimated light is separated by the main-dichroic mirrors 5R, 5G, and 5B into respective components of three primary colors (8R, 8G, and 8B). The light beams 8R, 8G, and 8B exit toward the LC display device 106.

On a horizontal plane which intersects all of the main-dichroic mirrors 5R, 5G, and 5B, the light beam 8G exiting from the main-dichroic mirror 5G perpendicularly enters the LC display device 106, whereas the light beams 8R and 8B respectively exiting from the main-dichroic mirrors 5R and 5B enter the LC display device 106 at an angle θ (in opposite directions) with respect to the longitudinal direction of the light beam 8G exiting from the main-dichroic mirror 5G.

Figure 3:
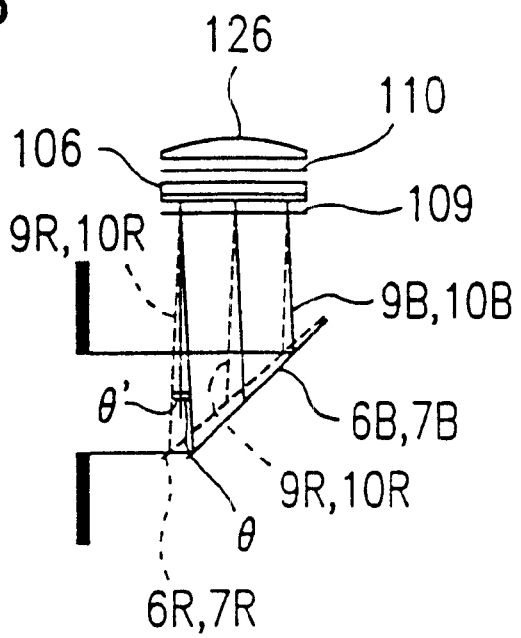
FIG. 3 is a plan view illustrating the vicinity of a group of sub-dichroic mirrors incorporated in the apparatus of the first embodiment of the invention.

As shown in FIG. 3, the group of sub-dichroic mirrors 6 includes sub-dichroic mirrors 6R and 6B (having selective reflectivity for red and blue, respectively). The collimated light is separated by the sub-dichroic mirrors 6R and 6B into red and blue components of light (9R and 9B), respectively. The light beams 9R and 9B exit toward the LC display device 106.

On a horizontal plane which intersects both sub-dichroic mirrors 6R and 6B, the light beams 9R and 9B respectively exiting from the sub-dichroic mirrors 6R and 6B enter the LC display device 106 at an angle θ' (in opposite directions) with respect to the normal axis direction of the LC display device 106 (hereinafter referred to as the "normal direction").

Similarly, as shown in FIG. 3, the group of sub-dichroic mirrors 7 includes sub-dichroic mirrors 7R and 7B (having selective reflectivity for red and blue, respectively). The collimated light is separated by the sub-dichroic mirrors 7R and 7B into respective components of light (10R and 10B). The light beams 10R and 10B exit toward the LC display device 106.

On a horizontal plane which intersects both sub-dichroic mirrors 7R and 7B, the light beams 10R and 10B respectively exiting from the sub-dichroic mirrors 7R and 7B enter the LC display device 106 at an angle θ' (in opposite directions) with respect to the normal direction of the LC display device 106.

Figure 4:
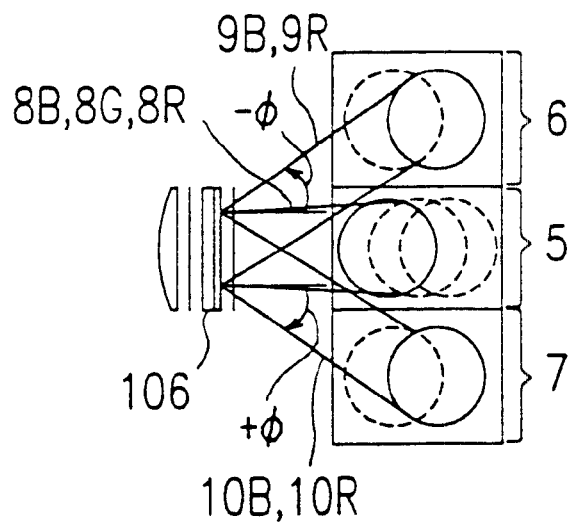
FIG. 4 is a side view illustrating the vicinities of main-dichroic mirrors and groups of sub-dichroic mirrors incorporated in the apparatus of the first embodiment of the invention.

The main-dichroic mirrors 5 are located in such a manner that their optical axes extend along the normal direction of the LC display device 106. On the other hand, the sub-dichroic mirrors 6 are slightly angled down from that direction, whereas the sub-dichroic mirrors 7 are slightly angled up from that direction. As a result, as shown in FIG. 4, on a vertical plane which intersects the main-dichroic mirrors 5 and the sub-dichroic mirrors 6 and 7, the light beams 8R, 8G, and 8B exiting from the main-dichroic mirrors 5R, 5G, and 5B, respectively, perpendicularly enter the LC display device 106. On the other hand, the light beams 9R and 9B respectively exiting from the sub-dichroic mirrors 6R and 6B and the light beams 10R and 10B respectively exiting from the sub-dichroic mirrors 7R and 7B are at an angle φ (in opposite directions) with respect to the light beams 8R, 8G, and 8B.

Therefore, the LC display device 106 receives the following seven light beams at respectively different angles: the light beams of red, green, and blue (8R, BG, and 8B) from the main-dichroic mirrors 5; the light beams 9R and 9B of red and blue from the sub-dichroic mirrors 6; and the light beams 10R and 10B of red and blue from the sub-dichroic mirrors 7.

Figure 14:
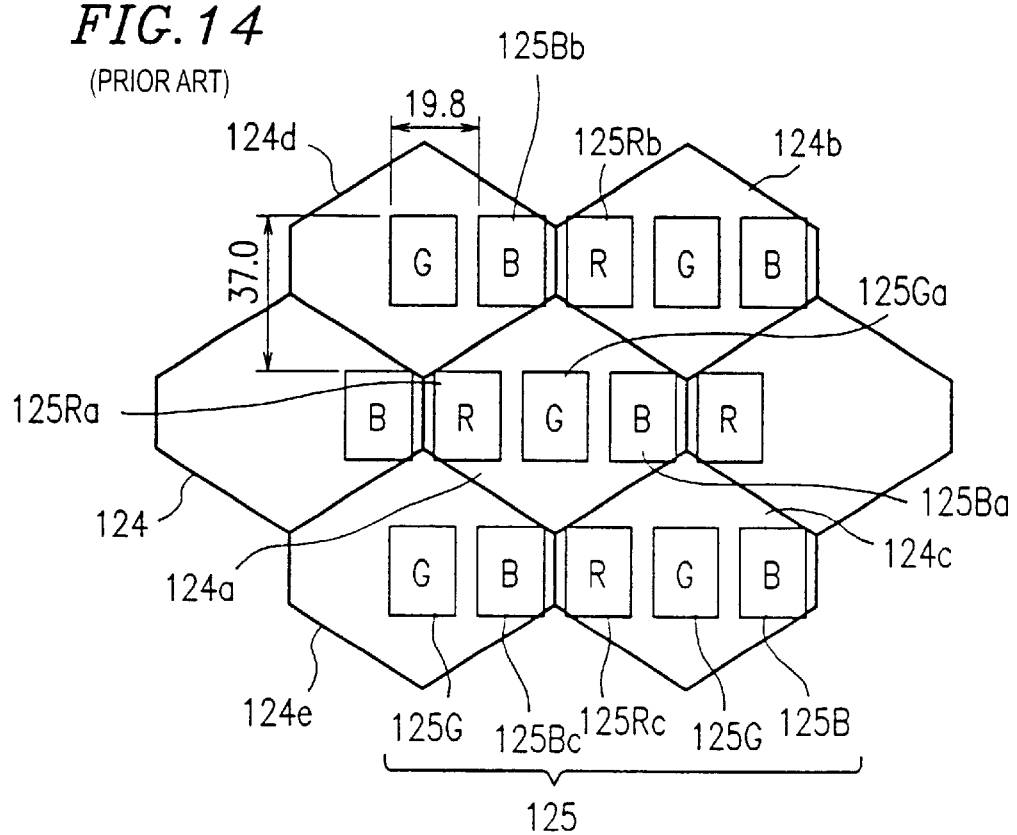
FIG. 14 is a diagram illustrating the relative locations of microlenses and their corresponding picture elements.

The picture elements 125 of the LC display device 106 are located relative to the microlenses 124 as shown in FIG. 14.

Now, an exemplary case will be described where the aforementioned seven light beams from the main-dichroic mirrors 5 and the sub-dichroic mirrors 6 and 7 enter the microlens 124a shown in the center of the diagram of FIG. 14. In FIG. 14, three rows of picture elements 125Xb, 125Xa, and 125Xc (X= R, B, or G) are illustrated adjoining one another in this order from top to bottom of the diagram.

Figure 5:
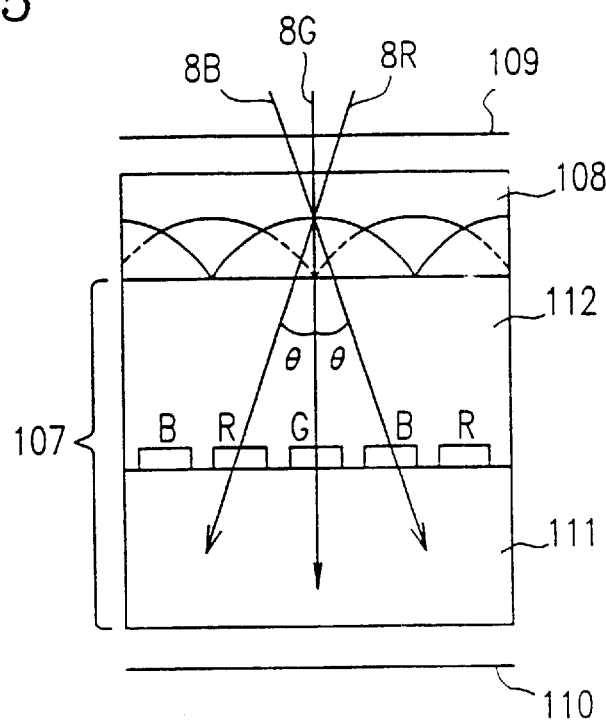
FIG. 5 is a diagram illustrating the angles of incidence of light beams entering the LC display device from the main-dichroic mirrors in accordance with the first embodiment of the invention.
Figure 6:
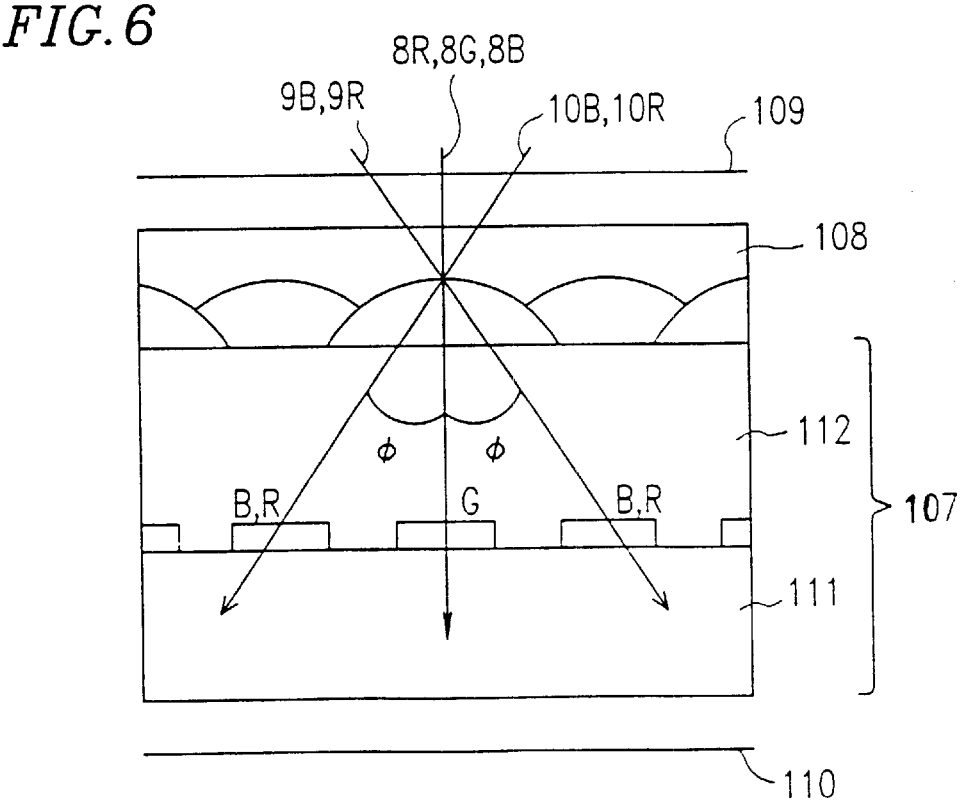
FIG. 6 is a diagram illustrating the angles of incidence of light beams entering the LC display device from the main-dichroic mirrors and the groups of sub-dichroic mirrors in accordance with the first embodiment of the invention.

The light beams 8R, 8G, and 8B from the main-dichroic mirrors 5 respectively enter the red picture element 125Ra, the green picture element 125Ga, and the blue picture element 125Ba in three discrete directions on the same horizontal plane (as shown in the plan view of FIG. 5) and perpendicularly to the LC display device 106 on a vertical plane (as shown in the side view of FIG. 6).

Figure 7:
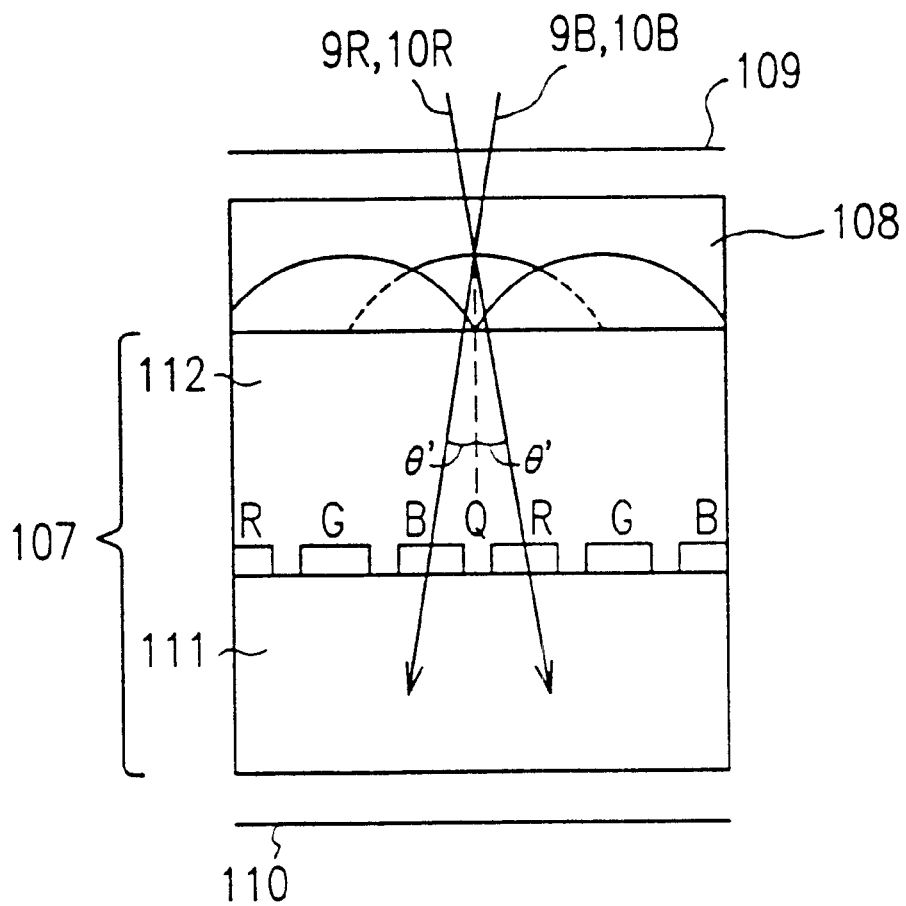
FIG. 7 is a diagram illustrating the angles of incidence of light beams entering the LC display device from the groups of sub-dichroic mirrors in accordance with the first embodiment of the invention.

On the other hand, the light beams 9R and 9B from the sub-dichroic mirrors 6 respectively enter the red picture element 125Rc and the blue picture element 125Bc in two discrete directions on the same horizontal plane (as shown in the plan view of FIG. 7) and at an angle φ with respect to the normal direction of the LC display device 106 on a vertical plane (as shown in the side view of FIG. 6). Similarly, the light beams 10R and 10B from the sub-dichroic mirrors 7 respectively enter the red picture element 125Rb and the blue picture element 125Bb in two discrete directions on the same horizontal plane (as shown in the plan view of FIG. 7) and at an angle φ (in the opposite direction) with respect to the normal direction of the LC display device 106 on a vertical plane (as shown in the side view of FIG. 6).

Thus, the seven light beams from the main-dichroic mirrors 5 and the sub-dichroic mirrors 6 and 7 enter the various picture elements 125 as described above.

Stated otherwise, the green picture element 125Ga, which coincides with the microlens 124a in the center, only receives the green light beam 8G from the main-dichroic mirrors 5 via the center microlens 124a. On the other hand, the red picture element 125Ra receives the red light beam 8R from the main-dichroic mirrors 5 via the center microlens 124a, as well as the red light beam 9R from the sub-dichroic mirrors 6 via the upper microlens 124d and the red light beam 10R from the sub-dichroic mirrors 7 via the lower microlens 124e. Similarly, the blue picture element 125Ba receives the blue light beam 8B from the main-dichroic mirrors 5 via the center microlens 124a, as well as the blue light beam 9B from the sub-dichroic mirrors 6 via the upper microlens 124b and the blue light beam 10B from the sub-dichroic mirrors 7 via the lower microlens 124c.

In other words, the green picture element 125Ga receives only one light beam, i.e., the light beam 8G, whereas the red picture element 125Ra receives three light beams (the light beams 8R, 9R, and 10R), and the blue picture element 125Ba receives three light beams (the light beams 8B, 9B, and 10B).

Thus, light beams of the corresponding colors are converged onto the red, green, and blue picture elements 125 of the LC display device 106 so as to be modulated thereby, exit the picture element 125, and are projected onto the screen 128 via the field lens 126 and the projection lens 127, whereby a color image is displayed.

It should be noted that the green light component tends to be insufficient due to only one light beam 8G entering the picture element 125Ga. In order to compensate for this, the incandescent light source 101 should be capable of emitting light with abundant green component, thereby correcting the color balance.

As described above, according to Example 1, not only the main-dichroic mirrors 5 but also the sub-dichroic mirrors 6 and 7 receive collimated light. Thus, the received peripheral portions of collimated light are effectively utilized, whereby the intensity of the light entering the LC display device 106 is enhanced.

Since the collimated light is received in a relatively large area defined by both the main-dichroic mirrors 5 and the sub-dichroic mirrors 6 and 7, it is possible to increase the diameter of the collimated light accordingly. As a result, it is possible to employ a sufficiently bright incandescent light source 101 while maintaining the parallelism of the collimated light, which also serves to enhance the intensity of the light entering the LC display device 106.

By thus enhancing the intensity of the light entering the LC display device 106, a bright display image can be provided as compared to what can be provided by a conventional projection LC display apparatus.

The angles θ, θ', and φ can be calculated in the following manner.

Figure 13:
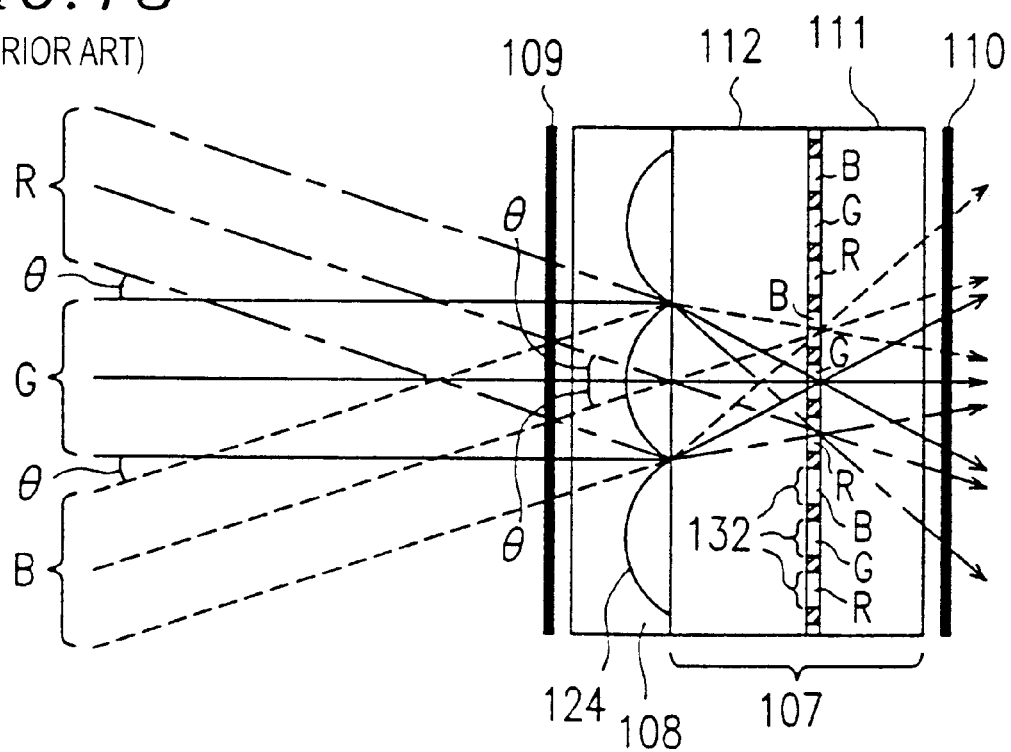
FIG. 13 is a cross-sectional view illustrating a LC panel and a microlens array.

It is assumed that a 1.43" display panel is formed by an arrangement of 480 (vertically)×1600 (horizontally) of picture elements 125, the picture elements 125 having a vertical pitch of 37 μm and a horizontal pitch of 19.8 μm. It is further assumed that the focal length of each microlens 124 of the microlens array 108 is equal to the thickness 0.207 mm of the substrate 112 (refractive index n: 1.52) shown in FIG. 13 (the equivalent focal length in the air=0.207 mm/1.52=0.136 mm).

In this case, the angle θ, by which the red and blue light beams 8R and 8B respectively exiting from the main-dichroic mirrors 5R and 5B are tilted with respect to the longitudinal direction of the light beam 8G, is calculated to be $\pm \tan^{-1}(19.8/136) = \pm 8.3°$. The angle θ', by which the red and blue light beams 9R, 9B, 10R, and 10B respectively exiting from the sub-dichroic mirrors 6 and 7 are tilted with respect to the normal axis direction of the LC display device 106, is calculated to be $\pm \tan^{-1} (9.9/136) = \pm 4.2°$. The angle $\phi$, by which the red and blue light beams 9R, 9B, 10R, and 10B respectively exiting from the sub-dichroic mirrors 6 and 7 are tilted with respect to the normal direction of the LC display device 106, is calculated to be $\pm \tan^{-1} (37/136) = \pm 15.2°$.

By adjusting the various dichroic mirrors so that the $\theta$, $\theta'$, and $\phi$ satisfy their respective calculated values as stated above, the respective light beams will form convergence spots on the corresponding pixel elements 125.

EXAMPLE 2

Figure 8:
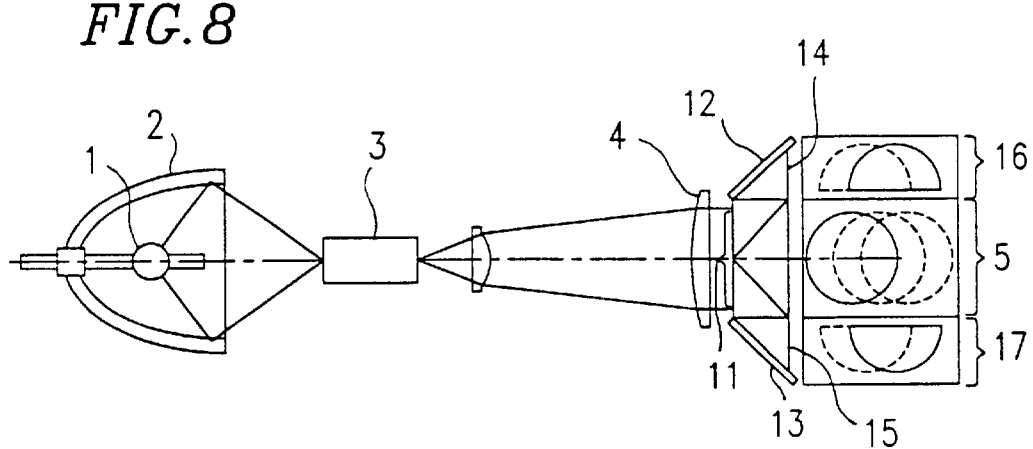
FIG. 8 is a side view illustrating a projection type color LC display apparatus according to a second embodiment of the invention.
Figure 9:
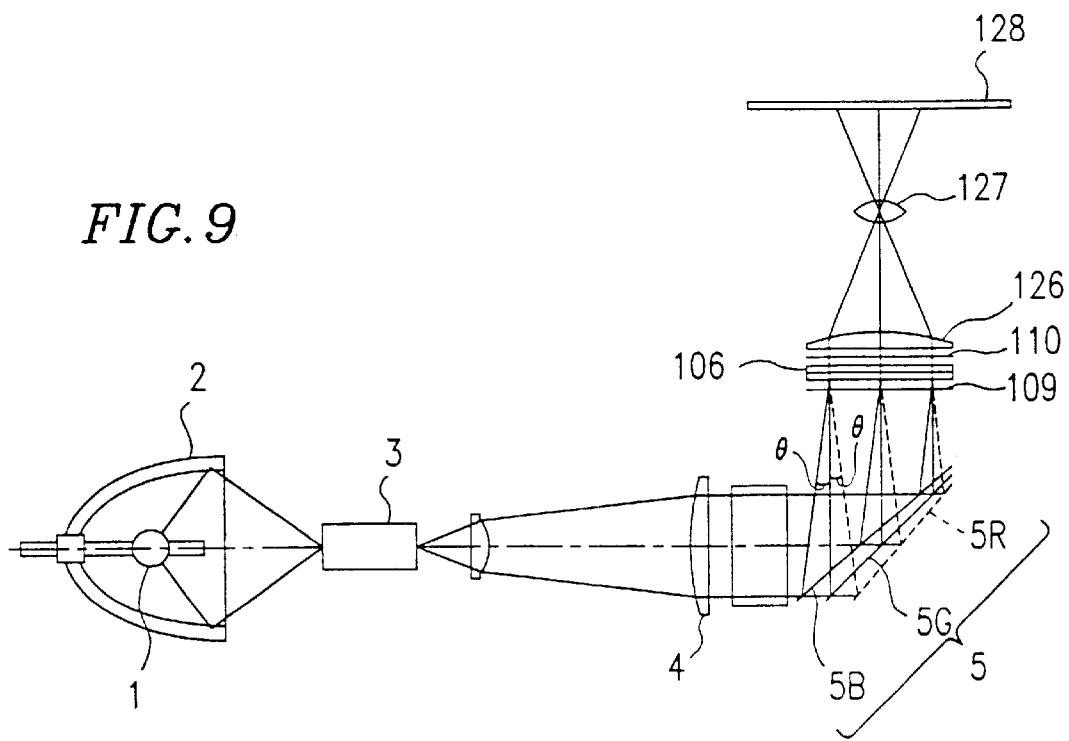
FIG. 9 is a plan view illustrating the projection type color LC display apparatus of the second embodiment (FIG. 8) as seen from above.

FIG. 8 is a side view illustrating a projection type color LC display apparatus according to Example 2 of the invention. FIG. 9 is a plan view illustrating the projection type color LC display apparatus as seen from above. In both FIGS. 8 and 9, constituent elements having similar functions to those of the elements in the conventional apparatus shown in FIGS. 1 and 2 are denoted by the same reference numerals as used therein.

The present apparatus incorporates an incandescent light source 1 which is a 100 W metal halide lamp (arc length: 1.2 mm), smaller than the incandescent light source 1 in the apparatus of Example 1 illustrated in FIGS. 1 and 2.

The present apparatus also incorporates a mirror 2 (having the shape of an ellipsoid of revolution with a first focal length of 22 mm and a second focal length of 110 mm, and an effective diameter $\phi$ of 80 mm), similar to the mirror 2 in the apparatus of Example 1 illustrated in FIGS. 1 and 2. However, the present apparatus incorporates a smaller condenser lens 4 than the condenser lens 4 in the apparatus of Example 1 illustrated in FIGS. 1 and 2. Therefore, a collimated light beam with a smaller diameter is provided in the present example.

Furthermore, as shown in FIG. 8, a polarizing beam splitter 11, reflection mirrors 12 and 13, and $\lambda/2$ plates 14 and 15 are provided in a subsequent stage following the condenser lens 4.

In accordance with the smaller diameter of the collimated light beam, groups 16 and 17 of sub-dichroic mirrors, which respectively are provided above and below a group 5 of main-dichroic mirrors, have a smaller vertical dimension than that of the groups 6 and 7 of sub-dichroic mirrors in the apparatus of Example 1 illustrated in FIGS. 1 and 2.

Among the components of the collimated light beam exiting from the condenser lens 4 and entering the polarizing beam splitter 11, only the P-polarization component passes through the polarizing beam splitter 11. On the other hand, the S-polarization component of the collimated light beam from the condenser lens 4 (which cannot pass through the polarizing beam splitter 11) is split by the polarizing beam splitter 11 and enters the reflection mirrors 12 and 13 so as to be reflected therefrom. The light beams reflected from the reflection mirrors 12 and 13 are led through the $\lambda/2$ plates 14 and 15 so as to be converted into P-polarization components. The resultant P-polarization light beams are incident on the respective groups 16 and 17 of sub-dichroic mirrors.

The P-polarization light beam entering the main-dichroic mirrors 5 is separated into respective components of red, green, and blue (8R, 8G, and 8B). The light beams 8R, 8G, and 8B enter a LC display device 106 at similar angles to the angles at which the respective light beams 8R, 8G, and 8B in Example 1 (shown in FIGS. 1 and 2) enter the LC display device 106 in Example 1.

The P-polarization light beam entering the sub-dichroic mirrors 16 is separated into respective components of red and blue (9R and 9B), in the same manner as shown in FIG. 3. The light beams 9R and 9B enter the LC display device 106 at similar angles to the angles at which the respective light beams 9R and 9B in Example 1 (shown in FIGS. 1 and 2) enter the LC display device 106 in Example 1.

Similarly, the P-polarization light beam entering the sub-dichroic mirrors 17 is separated into respective components of red and blue (10R and 10B), in the same manner as shown in FIG. 3. The light beams 10R and 10B enter the LC display device 106 at similar angles to the angles at which the respective light beams 10R and 10B in Example 1 (shown in FIGS. 1 and 2) enter the LC display device 106 in Example 1.

The angle $\phi$ (as defined in Example 1) of the red and blue light beams 8R and 8B respectively from the main-dichroic mirrors 5R and 5B, the angle $\theta'$ (as defined in Example 1) of the red and blue light beams 9R and 9B respectively from the sub-dichroic mirrors 16R and 16B, and the angle $\theta'$ of the red and blue light beams 10R and 10B respectively from the sub-dichroic mirrors 17R and 17B can be adjusted by accordingly tilting the respective dichroic mirrors.

On the other hand, the angle $\phi$ (as defined in Example 1) of the red and blue light beams 9R and 9B from the sub-dichroic mirrors 16 and the angle $\phi$ of the red and blue light beams 10R and 10B from the sub-dichroic mirrors 17 are adjusted by accordingly tilting the reflection mirrors 12 and 13, respectively, instead of tilting the sub-dichroic mirrors 16 and 17.

Thus, the adjustment of the angles of the sub-dichroic mirrors 16 and 17 is more simplified than in the apparatus illustrated in FIGS. 1 and 2, thereby facilitating the assembly and/or adjustment process.

The light source 1 in the apparatus of Example 2 has a smaller arc length and lower intensity than those of the light source 1 in the apparatus of Example 1 illustrated in FIGS. 1 and 2. Therefore, applying the principle described in Example 1 (i.e., utilization of peripheral portions of the collimated light) to the light source 1 in the apparatus of Example 2 would not produce a significant effect. However, since the light obtained from the light source 1 of Example 2 and collimated by the condenser lens 4 is polarized in a uniform direction in the above-described manner, the collimated light can be efficiently utilized by the principle of Example 2. That is, the highly collimated light of Example 2 can be efficiently converted into polarized light by means of the polarizing beam splitter 11 and the $\lambda/2$ plates 14 and 15 (the polarizing beam splitter 11 having excellent polarization separation characteristics and the $\lambda/2$ plates 14 and 15 having excellent polarization rotation characteristics). Since there is a relatively small loss of the collimated light and the S-polarization light is converted into P-polarization light before entering the incident side polarizing plate 109 of the LC display apparatus 106, substantially all of the collimated light is available for displaying an image (with substantially no absorption of S-polarization light occurring in the polarizing plate 109), thereby enhancing the image brightness. Since substantially no absorption or interruption of S-polarization light occurs in the polarizing plate 109, the polarizing plate 109 is prevented from being heated, and hence from melting or burning, due to such absorption/interruption of light. Furthermore, it is possible to miniaturize the cooling system for the device (e.g., a cooling fan) and reduce the production cost.

The present invention is not limited to the above-described Examples, but can be altered in various modifications. For example, the number of groups of sub-dichroic mirrors can be increased or decreased and/or the number of dichroic mirrors in each group can be increased or decreased. However, one should be aware that there is a close interdependence between the number of dichroic mirrors and/or the angles of light beams exiting from the dichroic mirrors and the arrangement of the microlenses and/or picture elements.

Figure 10:
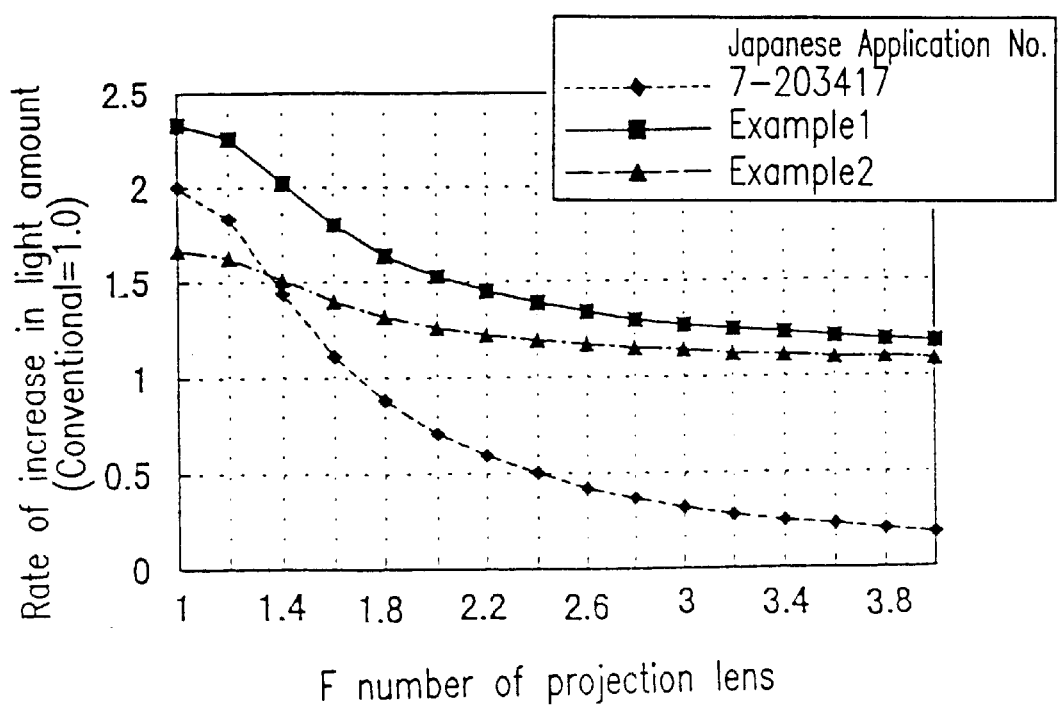
FIG. 10 is a graph illustrating the effects of the invention.

Next, the effects of improvement of the brightness of displayed images in accordance with the principles of Examples 1 and 2 have been calculated. These results are shown in the graph of FIG. 10.

First, with respect to the projection lens 127 in the conventional apparatus illustrated in FIG. 11, a characteristic curve of the amount of light exiting the projection lens 127 against the F number of the projection lens 127 was derived. Then, using the characteristic curve of the conventional apparatus as a reference, the rates of relative improvement in the light amount provided by the apparatuses of Examples 1 and 2 of the present invention are obtained. Specifically, the rates of improvement in the light amount provided by the apparatuses of Examples 1 and 2 are defined as ratios to the characteristic curve of the conventional apparatus defined as 1.

For reference, the rate of improvement in the light amount provided by the apparatus disclosed in Japanese Application No. 7-203417 (briefly described below), which has been filed by the present inventors, was also calculated in a similar manner.

In the calculation, it was assumed that all the constituent elements other than the dichroic mirrors are identical. The polarizing beam splitter, $\lambda/2$ plates, and reflection mirrors were assumed to incur negligible loss.

It was assumed that a 1.43" display panel is formed by an arrangement of 480 (vertically)×1600 (horizontally) of picture elements 125, the picture elements 125 having a vertical pitch of 37 $\mu$m and a horizontal pitch of 19.8 $\mu$m. It was assumed that the focal length of each microlens 124 of the microlens array 108 is equal to the thickness 0.207 mm of the substrate 111 (refractive index n: 1.52) shown in FIG. 13 (the equivalent focal length in the air=0.207 mm/1.52=0.136 mm). It was further assumed that each picture element 125 has an aperture ratio of 45.3%.

As seen from the graph of FIG. 10, the apparatus disclosed in Japanese Application No. 7-203417 (dotted line) provides significant increase in light amount over that provided by the conventional apparatus when the F number of the projection lens 127 is 1.7 or lower. In particular, the light amount increases two fold with the F number of the projection lens 127 being 1.0.

On the other hand, the apparatus of Example 1 (solid line) provides significant increase in light amount over that provided by the conventional apparatus regardless of the F number of the projection lens 127.

The apparatus of Example 2 (dot-dash line) also provides significant increase in light amount over that provided by the conventional apparatus regardless of the F number of the projection lens 127. In particular, the light amount increases over that provided by the apparatus disclosed in Japanese Application No. 7-203417 with the F number of the projection lens 127 being 1.4 or greater. Thus, it is preferable to prescribe the F number of the projection lens 127 at 1.4 or greater in the apparatus of Example 2.

Now, the apparatus disclosed in Japanese Application No. 7-203417, previously filed by the Applicant of the present application is briefly described.

Figure 15:
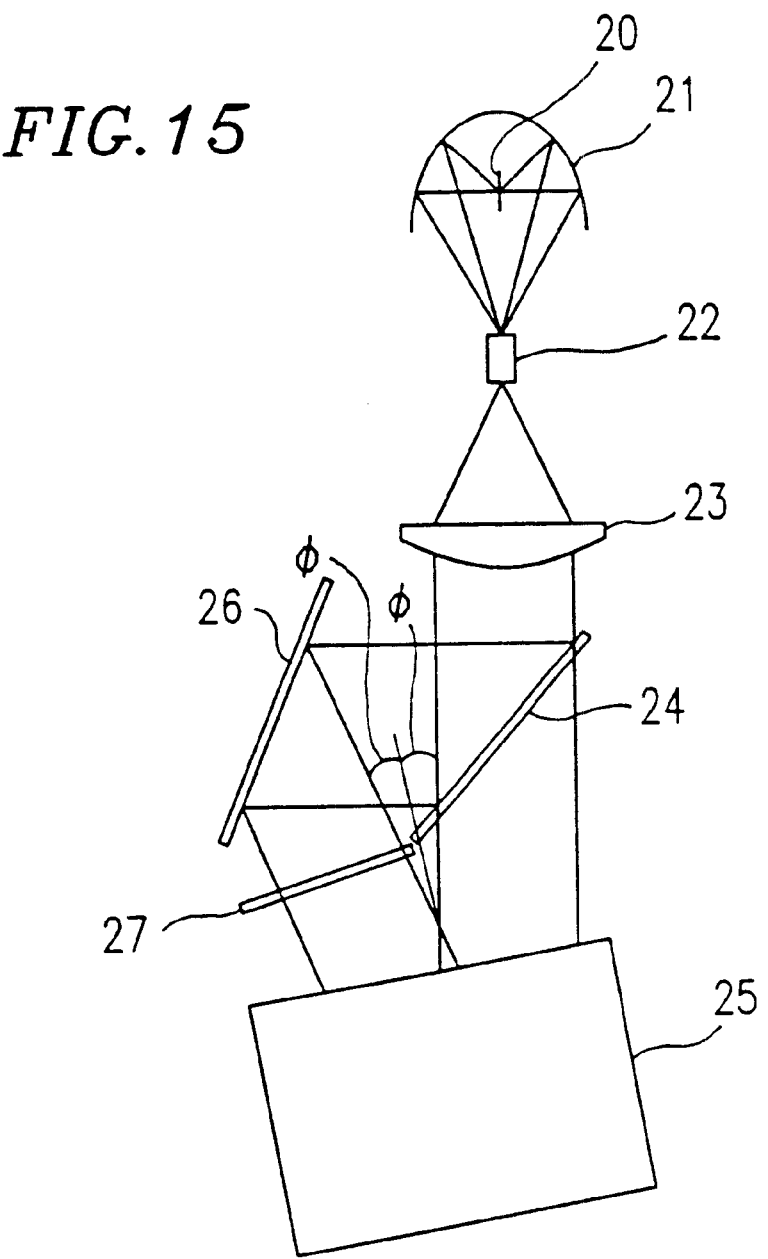
FIG. 15 is a cross-sectional view illustrating another conventional projection LC display apparatus.

In this apparatus, as shown in FIG. 15, the light emitted from an incandescent light source 20 and converged by a mirror 21 (shaped as an ellipsoid of revolution) enters an integrator 22 located in the vicinity of the second focal point of the mirror 21, whereby it becomes uniform in terms of its angular distribution, i.e., dispersed. This light is further collimated by means of a condenser lens 23, and separated into P-polarization light and S-polarization light by a polarization beam splitter 24. Specifically, the P-polarization light passes through the polarization beam splitter 24 to enter a group 25 of dichroic mirrors at an angle $\phi$. The S-polarization light is reflected from a reflection mirror 26, converted into P-polarization light via a $\lambda/2$ plate 27, and enter the dichroic mirrors 25 at the angle $\phi$.

The dichroic mirrors 25 separate the P-polarization light transmitted through the polarization beam splitter 24 into three components respectively corresponding to the three primary colors, which are incident on a LC display device (not shown). The dichroic mirrors 25 separate the P-polarization light from the $\lambda/2$ plate 27 into three components respectively corresponding to the three primary colors, which are incident on the LC display device. Thus, the LC display device receives light beams from six different angles.

As described with reference to the graph of FIG. 10, this apparatus cannot provide significant increase in light amount with a projection lens having a large F number. This is because, such a projection lens, having a small diameter in view of the angles of the light beams entering the LC display device, is likely to scatter a large portion of the received light.

Although dichroic mirrors are described in the above Examples, the present invention can suitably incorporate any wavelength band separation means that is capable of separating incident light into its color components.

Although condenser lenses are described in the above Examples, the present invention can suitably incorporate any light collimation means that is capable of collimating incident light.

In accordance with the apparatus of the present invention, sub-wavelength band separation means are provided adjacent a main-wavelength band separation means such that peripheral portions of collimated light are incident on the sub-wavelength band separation means to form light beams from the peripheral portions of collimated light, which exit toward a LC display device. In other words, the peripheral portions of the collimated light is efficiently utilized by the sub-wavelength band separation means, thereby enhancing the brightness of the displayed image.

Since polarization means for polarizing the collimated light in a uniform direction is provided between the light collimation means and the main-wavelength band separation means and the sub-wavelength band separation means, the light beams entering the LC display device are polarized in a uniform direction. As a result, the LC display device achieves an efficient display function.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection type color liquid crystal display apparatus comprising:

light collimation means for producing collimated light at a given point in time;

main-wavelength band separation means for receiving the collimated light from the light collimation means and producing a plurality of light beams having respectively different wavelength bands and exiting at respectively different angles;

sub-wavelength band separation means provided adjacent the main-wavelength band separation means, the sub-wavelength band separation means receiving the collimated light from the light collimation means and producing at least one light beam having the same wavelength band as the wavelength band of at least one of the light beams from the main-wavelength band separation means;

wherein the sub-wavelength band separation means receives the collimated light produced at the given point in time by the light collimation means simultaneously with the main-wavelength band separation means, and wherein the sub-wavelength band separation means produces the at least one light beam simultaneously with the beams produced by the main wavelength band separation means to supplement the light from the main wavelength band separation means;

a liquid crystal display device for receiving the light beams from the main-wavelength band separation means and the light beams from the sub-wavelength band separation means and modulating the light beams; and an optical system for receiving the light beams transmitted through the liquid crystal display device and thereby projecting an image.

2. A projection type color liquid crystal display apparatus according to claim 1, wherein the collimated light includes a large amount of a wavelength component corresponding to the wavelength band of at least one of the light beams from the main-wavelength band separation means excluding the light beams having the wavelength bands of the light beams produced from the sub-wavelength band separation means.

3. A projection type color liquid crystal display apparatus according to claim 1, wherein a polarization means for polarizing the collimated light in a uniform direction is provided between the light collimation means and the main-wavelength band separation means and the sub-wavelength band separation means.

4. A projection type color liquid crystal display apparatus comprising:

light collimation means for producing collimated light;

main-wavelength band separation means for receiving the collimated light from the light collimation means and producing a plurality of light beams having respectively different wavelength bands and exiting at respectively different angles;

sub-wavelength band separation means provided adjacent the main-wavelength band separation means, the sub-wavelength band separation means receiving the collimated light from the light collimation means and producing at least one light beam having the same wavelength band as the wavelength band of at least one of the light beams from the main-wavelength band separation means;

a liquid crystal display device for receiving the light beams from the main-wavelength band separation means and the light beams from the sub-wavelength band separation means and modulating the light beams;

wherein a polarization means for polarizing the collimated light in a uniform direction is provided between the light collimation means and the main-wavelength band separation means and the sub-wavelength band separation means;

wherein the polarization means directs the collimated light beams to the main-wavelength band separation means and the sub-wavelength band separation means at respectively different angles; and an optical system for receiving the light beams transmitted through the liquid crystal display device and thereby projecting an image.

5. A projection type color liquid crystal display apparatus comprising:

light collimation means for producing collimated light at a given point in time;

a group of main-dichroic mirrors for receiving the collimated light from the light collimation means and producing three light beams having respectively different wavelengths bands and exiting at respectively different angles;

first and second groups of sub-dichroic mirrors provided adjacent the main-dichroic mirrors, the first and second groups of sub-dichroic mirrors receiving the collimated light from the light collimation means and producing light beams having the same wavelength bands as the wavelength bands of two of the light beams from the group of main-dichroic mirrors;

wherein the first and second groups of sub-dichroic mirrors receive the collimated light produced at the given point in time by the light collimation means at the same time that the main-dichroic mirrors receive the collimated light produced at the given point in time by the light collimation means, and wherein the sub-dichroic mirrors produce the light beams simultaneously with the beams produced by the main-dichroic mirrors to supplement the light from the main-dichroic mirrors;

a liquid crystal display device for receiving the light beams from the group of main-dichroic mirrors and the light beams from the first and second groups of the sub-dichroic mirrors and modulating the light beams; and an optical system for receiving the light beams transmitted through the liquid crystal display device and thereby projecting an image.

6. A projection type color liquid crystal display apparatus according to claim 5, wherein the collimated light includes a large amount of a wavelength component corresponding to the wavelength band of one of the light beams from the group of main-dichroic mirrors excluding the light beams having the wavelength bands of the light beams produced from the groups of sub-dichroic mirrors.

7. The apparatus of claim 1, wherein the first color wavelength exits the main-wavelength band separation means at the first angle relative to normal to the display device, and said first color wavelength exits the sub-wavelength band separation means at the second angle relative to normal to the display device, so that the display device receives the first wavelength at said first and second angles which are different from one another, from the main and sub wavelength band separation means, respectively.

8. The apparatus of claim 1, wherein said first wavelength is red, and wherein a red picture element of said display device receives first, second and third different red light beams of said first wavelength at said first, said second, and a third different angles, from said main wavelength band separation means, said sub-wavelength band separation means, and another sub-wavelength band separation means, respectively.

9. The apparatus of claim 8, wherein said second and third angles are on opposite sides of an angle normal to the display device.

10. The apparatus of claim 1, wherein a first color wavelength is directed toward the display device at a first angle relative to normal to the display device by the main-wavelength band separation means, and at a second angle relative to normal to the display device by the sub-wavelength band separation means, said first and second angles being different.

11. The apparatus of claim 5, wherein a picture element of said display device receives first, second, and third light beams comprising a same color wavelength, at respective first, second and third different angles from said first group of sub-dichroic mirrors, said group of main-dichroic mirrors, and said second group of sub-dichroic mirrors, respectively.

* * * * *